(12) United States Patent
Motoi et al.

(10) Patent No.: US 12,011,944 B2
(45) Date of Patent: Jun. 18, 2024

(54) MEDIUM ISSUANCE SYSTEM AND MEDIUM ISSUANCE METHOD

(71) Applicant: Dai Nippon Printing Co., Ltd., Tokyo (JP)

(72) Inventors: Takumi Motoi, Tokyo (JP); Toru Nishioka, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 173 days.

(21) Appl. No.: 16/490,374

(22) PCT Filed: Mar. 1, 2018

(86) PCT No.: PCT/JP2018/007821
§ 371 (c)(1),
(2) Date: Aug. 30, 2019

(87) PCT Pub. No.: WO2018/159767
PCT Pub. Date: Sep. 7, 2018

(65) Prior Publication Data
US 2020/0009892 A1    Jan. 9, 2020

(30) Foreign Application Priority Data
Mar. 3, 2017    (JP) .................. 2017-040464

(51) Int. Cl.
*B41M 5/025*    (2006.01)
*B41F 16/00*    (2006.01)
(Continued)

(52) U.S. Cl.
CPC ............. *B41M 5/025* (2013.01); *B41F 16/00* (2013.01); *B41F 16/0046* (2013.01); *B41M 3/14* (2013.01);
(Continued)

(58) Field of Classification Search
CPC .... B41M 5/0064; B41M 5/025; B41M 5/267; B41F 16/00; B41F 16/0046; B32B 25/305;
(Continued)

(56) References Cited

U.S. PATENT DOCUMENTS 2,216,042 A * 9/1940 Metzner .................. B41J 15/24
400/519.1
3,139,292 A * 6/1964 Swyden .................. B41J 11/26
462/5
(Continued)

FOREIGN PATENT DOCUMENTS

EP        2223808 A1    9/2010
GB        2536918 A     10/2016
(Continued)

OTHER PUBLICATIONS

Supplementary European Search Report dated Dec. 3, 2020, issued for EP Application No. 18760259.4.
(Continued)

*Primary Examiner* — Jill E Culler
(74) *Attorney, Agent, or Firm* — Locke Lord LLP; James E. Armstrong, IV; Nicholas J. DiCeglie, Jr.

(57) ABSTRACT

There is provided a medium issuance system which can easily transfer print on an intermediate transfer sheet to a polycarbonate transfer medium. The medium issuance system 50 includes an intermediate transfer sheet supply section 52 for supplying an intermediate transfer sheet 53 to a polycarbonate transfer medium 1, and a hot stamp 55 for heating and pressing the intermediate transfer sheet 53 to transfer print 10A, 10C on the intermediate transfer sheet 53 to the transfer medium 1. The hot stamp 55 heats and presses the intermediate transfer sheet 53 at a temperature of not less
(Continued)

than 120° C. and not more than 200° C., and at a pressure of not less than 0.1 kgf/cm² and not more than 1000 kgf/cm².

8 Claims, 12 Drawing Sheets

(51) Int. Cl.
| | |
|---|---|
| B41M 3/14 | (2006.01) |
| B41M 5/00 | (2006.01) |
| B41M 5/26 | (2006.01) |
| B42D 25/41 | (2014.01) |
| B32B 27/08 | (2006.01) |
| B32B 37/06 | (2006.01) |
| B32B 37/10 | (2006.01) |
| B32B 38/00 | (2006.01) |
| B32B 38/04 | (2006.01) |
| B42D 25/305 | (2014.01) |
| B42D 25/455 | (2014.01) |
| B42D 25/46 | (2014.01) |

(52) U.S. Cl.
CPC .......... B41M 5/0064 (2013.01); B41M 5/267 (2013.01); B42D 25/41 (2014.10); B32B 27/08 (2013.01); B32B 37/06 (2013.01); B32B 37/1027 (2013.01); B32B 2038/042 (2013.01); B32B 38/145 (2013.01); B32B 2307/402 (2013.01); B32B 2310/0843 (2013.01); B32B 2369/00 (2013.01); B42D 25/305 (2014.10); B42D 25/455 (2014.10); B42D 25/46 (2014.10)

(58) Field of Classification Search
CPC ....... B32B 25/455; B32B 25/46; B32B 27/08; B32B 37/06
See application file for complete search history.

(56) References Cited

U.S. PATENT DOCUMENTS

| | | | | |
|---|---|---|---|---|
| 3,606,122 A * | 9/1971 | Brewster et al. | ........ | B41J 11/26 226/74 |
| 5,318,941 A * | 6/1994 | Ohshima | ................ | B41M 3/14 503/227 |
| 6,377,291 B2 * | 4/2002 | Andoh | .................. | B41J 2/0057 347/176 |
| 7,143,953 B2 * | 12/2006 | Takahashi | .............. | G06K 19/18 235/494 |
| 8,041,107 B2 * | 10/2011 | Kato | .................. | G01N 21/8422 382/152 |
| 2003/0025780 A1 * | 2/2003 | Fujimoto | ................. | B41J 2/325 347/213 |
| 2003/0065938 A1 * | 4/2003 | Kitamura | .................. | G07F 7/08 726/20 |
| 2003/0205399 A1 * | 11/2003 | Uchihiro | .......... | G06K 19/07745 174/520 |
| 2006/0237545 A1 | 10/2006 | Takahashi et al. | | |
| 2014/0139606 A1 | 5/2014 | Sakai et al. | | |

FOREIGN PATENT DOCUMENTS

| | | | | |
|---|---|---|---|---|
| JP | 2003-94864 A | | 4/2003 | |
| JP | 2003094864 A | * | 4/2003 | |
| JP | 2004-213253 A | | 7/2004 | |
| JP | 2004-255782 A | | 9/2004 | |
| JP | 2008-188865 A | | 8/2008 | |
| JP | 2009-000839 A | | 1/2009 | |
| JP | 2013-001087 A | | 1/2013 | |
| JP | 2016-221862 A | | 12/2016 | |
| WO | 2015/129346 A1 | | 9/2015 | |
| WO | WO-2015129346 A1 | * | 9/2015 | ............ B42D 25/23 |
| WO | 2017/014258 A1 | | 1/2017 | |

OTHER PUBLICATIONS

International Search Report dated May 1, 2018, issued for PCT/JP2018/007821.

Translation of International Preliminary Report of Patentability dated Sep. 12, 2019, issued for PCT/JP2018/007821.

Office Action issued in Japanese Patent Application No. JP 2019-503116, dated Oct. 22, 2021.

* cited by examiner

MEDIUM ISSUANCE SYSTEM AND MEDIUM ISSUANCE METHOD

TECHNICAL FIELD

The present invention relates to a medium issuance system and a medium issuance method for issuing a polycarbonate card such as an ID card having an IC module, and more particularly to a medium issuance system and a medium issuance method which can easily issue a polycarbonate card.

BACKGROUND ART

An ID card (hereinafter also referred to as a medium), such as a national ID card, a driver's license or an employee ID card, contains an IC module and, as a whole, is made of polycarbonate having heat resistance and durability.

In the production of such an ID card, a card-shaped transfer medium (transfer object) is first prepared, and then an intermediate transfer sheet, to which print such as a facial image has been transferred, is supplied onto the transfer medium. Subsequently, the print on the intermediate transfer sheet is transferred to the transfer medium.

However, since the transfer medium is made of polycarbonate having heat resistance and durability, it is difficult to securely transfer the print on the intermediate transfer sheet to the transfer medium. Therefore, it is conventional practice to laminate an adhesive receiving layer, e.g. made of polyurethane or polyvinyl chloride, to the transfer medium in order to securely transfer the print on the intermediate transfer sheet to the transfer medium.

CITATION LIST

Patent Literature

Patent document 1: Japanese Patent Laid-Open Publication No. 2013-1087

SUMMARY OF THE INVENTION

Problems to be Solved by the Invention

The present invention has been made in view of the above situation. It is therefore an object of the present invention to provide a medium issuance system and a medium issuance method which can easily and securely transfer print on an intermediate transfer sheet to a polycarbonate transfer medium without the provision of a receiving layer on the transfer medium.

Means for Solving the Problems

The present invention provides a medium issuance system, comprising: a transfer medium loading section for loading a transfer medium; an intermediate transfer sheet supply section, provided downstream of the transfer medium loading section in a transport direction of the transfer medium, for supplying an intermediate transfer sheet to the transfer medium loaded from the transfer medium loading section, said intermediate transfer sheet having print, including an image, which has been transferred to its transfer medium-facing surface; a hot stamp, provided in the intermediate transfer sheet supply section, for heating and pressing the intermediate transfer sheet from the surface opposite to the transfer medium-facing surface, thereby transferring the print to the transfer medium; and a transport section for transporting the transfer medium, loaded from the transfer medium loading section, to the intermediate transfer sheet supply section, wherein the hot stamp heats and presses the intermediate transfer sheet at a temperature of not less than 120° C. and not more than 200° C., and at a pressure of not less than 0.1 kgf/cm$^2$ and not more than 1000 kgf/cm$^2$.

In a preferred embodiment of the present invention, the medium issuance system further comprises a laser printing layer sheet supply section, provided downstream of the intermediate transfer sheet supply section, for superimposing a laser printing layer sheet on the print which has been transferred to the transfer medium.

In a preferred embodiment of the present invention, the medium issuance system further comprises a transparent layer sheet supply section, provided downstream of the laser printing layer sheet supply section, for laminating a transparent layer sheet to the laser printing layer sheet.

In a preferred embodiment of the present invention, the medium issuance system further comprises a bonding apparatus, provided downstream of the transparent layer sheet supply section, for heating the laser printing layer sheet and the transparent layer sheet and pressing the laser printing layer and the transparent layer sheet against the transfer medium.

In a preferred embodiment of the present invention, the medium issuance system further comprises a laser printing apparatus, provided downstream of the laser printing layer sheet supply section, for irradiating the laser printing layer sheet with laser light to perform printing.

In a preferred embodiment of the present invention, the transfer medium contains an IC module, and the medium issuance system is provided with an IC module writing section for writing data into the IC module.

In a preferred embodiment of the present invention, the medium issuance system further comprises a punching device, provided upstream of the laser printing apparatus, for punching out the transfer medium to remove a peripheral portion thereof.

In a preferred embodiment of the present invention, the medium issuance system further comprises an image recognizer for recognizing an image on the transfer medium.

In a preferred embodiment of the present invention, the print of the transfer medium includes an ID mark, and the medium issuance system is provided with an ID mark reader for reading the ID mark.

In a preferred embodiment of the present invention, the medium issuance system further comprises a laser printing apparatus, provided downstream of the laser printing layer sheet supply section, for irradiating the laser printing layer sheet with laser light to perform printing, and an image recognizer for recognizing an image on the transfer medium. The print of the transfer medium includes an ID mark, and the medium issuance system is provided with an ID mark reader for reading the ID mark. The medium issuance system is also provided with a controller which performs matching between read information from the ID mark reader and the image recognizer and printing information to be sent to the laser printing apparatus.

The present invention also provides a medium issuance method, comprising the steps of: supplying an intermediate transfer sheet to a transfer medium, said intermediate transfer sheet having print, including an image, which has been transferred to its transfer medium-facing surface; and heating and pressing the intermediate transfer sheet from the surface opposite to the transfer medium-facing surface by using a hot stamp, thereby transferring the print to the transfer medium, wherein the hot stamp heats and presses the intermediate transfer sheet at a temperature of not less than 120° C. and not more than 200° C., and at a pressure of not less than 0.1 kgf/cm² and not more than 1000 kgf/cm².

The present invention also provides a medium comprising a plurality of polycarbonate layers, wherein print, including an image, is formed on the surface of an external layer of the polycarbonate layers without the presence of an intervening layer, formed of a material other than polycarbonate, between the print and the external layer.

Advantageous Effects of the Invention

According to the present invention, print on an intermediate transfer sheet can be easily and securely transferred to a polycarbonate transfer medium.

DESCRIPTION OF THE EMBODIMENTS

First Embodiment

A card issuance system (also referred to as a medium issuance system) according to a first embodiment will now be described in detail with reference to FIGS. 1 through 5 and some specific examples.

At the outset, an ID card (also referred to as a medium), produced by the card issuance system according to the first embodiment, will be described with reference to FIG. 5.

Figure 5:
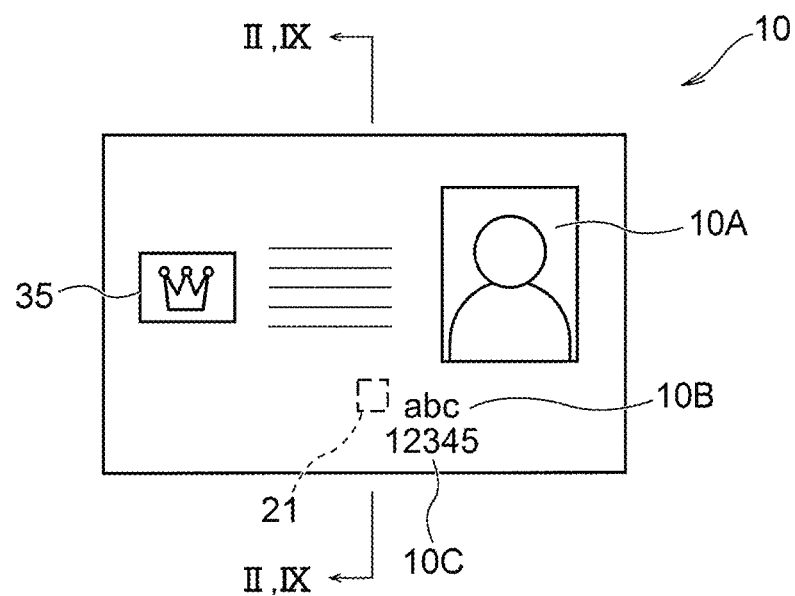
FIG. 5 is a plan view of the ID card.

As shown in FIG. 5, the ID card 10 may be, for example, a national ID card, a driver's license or an employee ID card. While the ID card 10 constitutes a medium, media according to the present invention may include, besides the ID card 10, an information page of a security document such as a passport (see FIG. 17).

Figure 17:
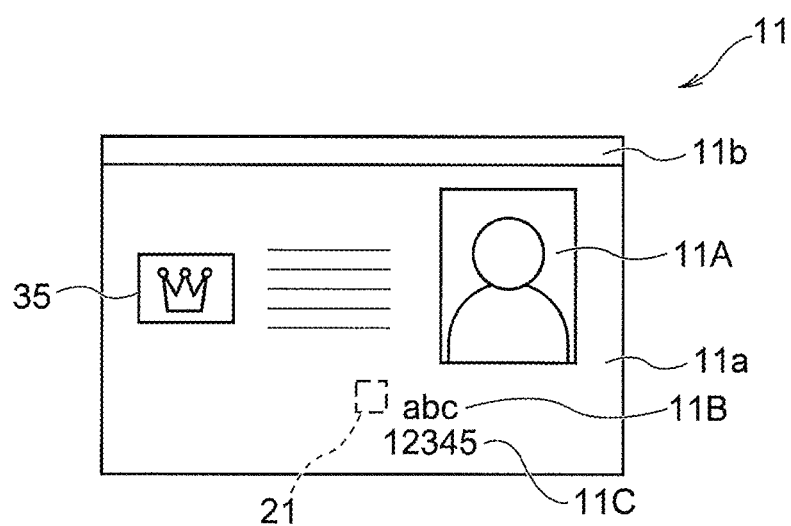
FIG. 17 is a plan view of an information page of a security document.

A facial image 10A and an ID mark 10C such as a bar code or an ID number have been transferred to the front surface of the ID card 10 and, as will be described later, characters 10B are printed by laser irradiation. Further, a volume hologram 35 appears on the front surface of the ID card 10. On the other hand, in the case of a medium comprised of the information page 11 of a security document, shown in FIG. 17, the information page 11 includes an information page body 11a containing a facial image 11A, characters 11B and an ID mark 11C, and a hinge portion 11b connecting with the information page body 11a. The facial image 11A, the characters 11B and the ID mark 11C can be obtained by transferring print. The information page 11 is coupled, in the hinge portion 11b, to the other pages of the security document such as a passport. Referring to FIG. 17, the information page 11 contains a volume hologram 35 and an IC chip 21.

The facial image 11A, which has been transferred to the front surface of the ID card 10, is an image of a holder of the ID card 10. The characters 10B, printed on the front surface of the ID card 10, include personal information such as the name and the date of birth of the ID card holder.

The ID card 10 will now be further described with reference to FIG. 2.

The ID card 10 includes an intermediate layer 13, an IC module holding layer 12 provided on the lower surface (one surface) of the intermediate layer 13, a contactless IC module 20 held in the IC module holding layer 12, and a laser printing layer 15 provided on the upper surface (the other surface) of the intermediate layer 13 via a first white layer 33.

The IC module 20 includes a substrate 21, and an IC chip 22a provided on the substrate 21 and covered with a sealing resin 22b. The IC chip 22a and the sealing resin 22b constitute an IC chip body 22 (see FIG. 3). In the illustrated case, the thickness of the IC chip body 22 is larger than the thickness of the substrate 21. For example, the thickness of the IC chip body 22 is 50 μm to 220 μm, while the thickness of the substrate 21 is 50 μm to 100 μm. By making the thickness of the IC chip body 22 larger than the thickness of the substrate 21, deformation of the entire IC module 20 can be reduced.

The IC module 20 having the above construction is held in the IC module holding layer 12. In the illustrated case, the IC module holding layer 12 includes a substrate accommodating layer 12a accommodating the substrate 21 of the IC module 20 and housing the substrate 21, and an IC chip body accommodating layer (also referred to as an IC chip accommodating layer) 12b accommodating the IC chip body 22 containing the IC chip 22a, and housing the IC chip body 22.

An antenna 25, connected to the IC chip 22a of the IC module 20, is disposed between the substrate accommodating layer 12a and the IC chip accommodating layer 12b of the IC module holding layer 12. The antenna 25 is made of copper, and is interposed between the substrate accommodating layer 12a and the IC chip accommodating layer 12b (see FIGS. 2 and 4).

The IC module holding layer 12 has an IC module housing space 40 in which the IC module 20 is housed and which is composed of an opening 38 formed in the substrate accommodating layer 12a, and an opening 39 formed in the IC chip accommodating layer 12b. The IC module housing space 40 is closed from above and below with the intermediate layer 13 and with an additional intermediate layer 14a provided on the lower surface of the IC module holding layer 12.

The laser printing layer 15 is blackened by irradiation with laser light so that a desired character can be displayed. To this end, the laser printing layer 15 is formed of polycarbonate containing a laser coloring accelerator and, when irradiated with laser light, the laser coloring accelerator is given heat energy. The heat energy chars and blackens carbon contained in the polycarbonate in contact with the laser coloring accelerator, resulting in display of a character.

A first external transparent layer 17 is provided on the upper surface of the laser printing layer 15, and a volume hologram 35 is interposed between the laser printing layer 15 and the first external transparent layer 17. The volume hologram 35 can display, for example, a crown in the ID card 10 (see FIG. 5).

Print 30, such as characters, a pattern, etc., has been formed on the upper surface (outer surface) of the first white layer 33.

The print 30, such as characters, a pattern, etc., includes information displayed on the front surface of the ID card 10. Such information includes, for example, general information other than individual information such as name and address. The individual information such as name and address is formed by irradiating the laser printing layer 15 with laser light.

A second white layer 34 and a second external transparent layer 18 are provided in this order on the lower surface of the additional intermediate layer 14a. Print 30, such as characters, a pattern, etc., has been formed also on the lower surface (outer surface) of the second white layer 34. However, such print 30 need not necessarily be provided on the lower surface of the second white layer 34.

The first white layer 33 functions to enhance visibility of the print 30, which has been formed on the first white layer 33, when viewing the print 30 from the side of the first external transparent layer 17.

In particular, since the print 30, which is light-colored, is provided on the first white layer 33, the print 30 can be easily viewed (checked) from the side of the first external transparent layer 17.

Similarly, light-colored print 30 has been formed on the second white layer 34. Since the print 30 is provided on the second white layer 34, the print 30 can be easily viewed (checked) from the side of the second external transparent layer 18.

The materials of the respective layers constituting the ID card 10 will now be described.

The intermediate layer 13, the first external transparent layer 17, the additional intermediate layer 14a and the second external transparent layer 18 are all made of transparent polycarbonate.

The substrate accommodating layer 12a and the IC chip accommodating layer 12b of the IC module holding layer 12, the first white layer 33 and the second white layer 34 are all made of white polycarbonate.

The laser printing layer 15 is made of polycarbonate containing a laser coloring accelerator.

The first white layer 33, the intermediate layer 13, the IC module holding layer 12, the additional intermediate layer 14a, the second white layer 34 and the second external transparent layer 18 of the ID card 10 constitute a transfer medium (transfer object) 1.

The ID card 10 can be obtained by bonding the laser printing layer (laser printing layer sheet) 15 and the first external transparent layer (transparent layer sheet) 17 to the transfer medium 1.

The sizes of the respective layers constituting the ID card 10 will now be described.

Figure 2:
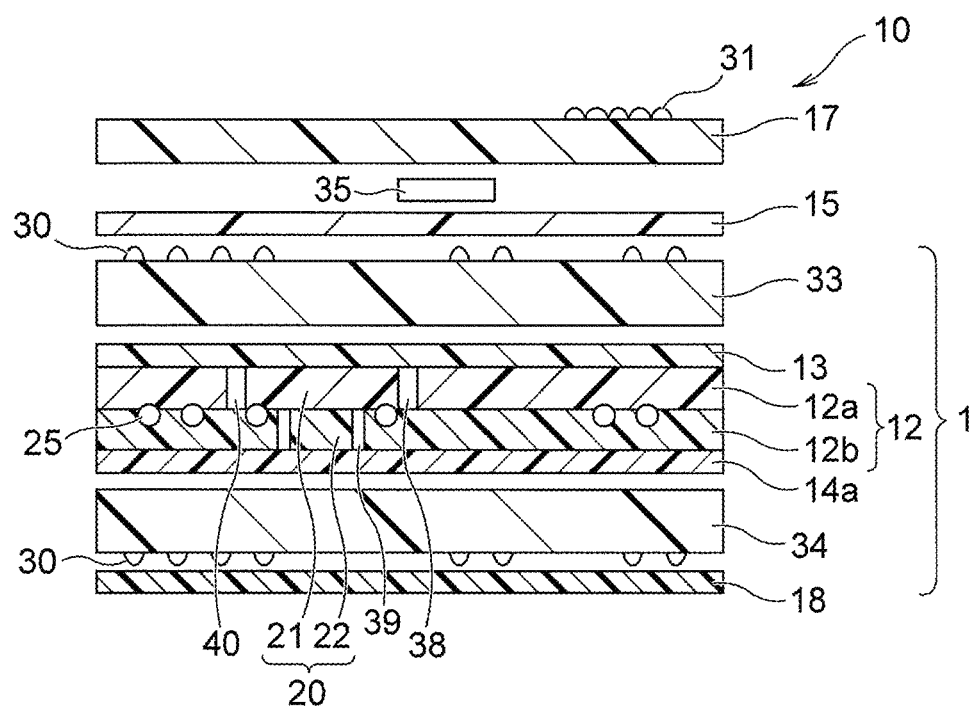
FIG. 2 is a cross-sectional side view of an ID card, showing a cross-section in the line-II direction of FIG. 5.
Figure 3:
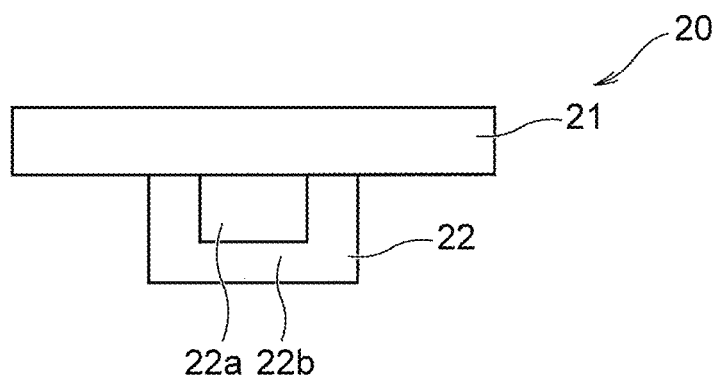
FIG. 3 is a cross-sectional side view of an IC module.

The overall thickness of the ID card 10 shown in FIG. 2 is, for example, 800 μm. In one example, the thickness of the first external transparent layer 17 is 105 μm, the thickness of the laser printing layer 15 is 50 μm, the thickness of the first white layer 33 is 105 μm, the thickness of the intermediate layer 13 is 40 μm, the thickness of the substrate accommodating layer 12a is 105 μm, the thickness of the IC chip accommodating layer 12b is 150 μm, the thickness of the additional intermediate layer 14a is 40 μm, the thickness of the second white layer 34 is 105 μm, and the thickness of the second external transparent layer 18 is 105 μm.

A card issuance system 50 for producing the ID card 10 will now be described.

As described above, the card issuance system 50 is to produce the ID card 10. The card issuance system 50 includes a transfer medium loading section 51 for laminating and loading the polycarbonate transfer medium (polycarbonate transfer object) 1, an intermediate transfer sheet supply section 52, provided downstream of the transfer medium loading section 51 in the transport direction of the transfer medium 1, for supplying an intermediate transfer sheet 53 to the transfer medium 1 loaded from the transfer medium loading section 51, and a hot stamp 55, provided in the intermediate transfer sheet supply section 52, for heating and pressing the intermediate transfer sheet 53 from the surface opposite to the transfer medium 1-facing surface.

The intermediate transfer sheet supply section 52 includes a feed roll 52a for unwinding the intermediate transfer sheet 53, and a take-up roll 52b for taking up the intermediate transfer sheet 53. Print, including a facial image 10A, characters 10B and an ID mark 10C such as a bar code or an ID number, has been transferred to the transfer medium 1-facing surface of the intermediate transfer sheet 53 (see FIG. 5).

The transfer medium 1, loaded from the transfer medium loading section 51, has the print 30 provided on the first white layer 33 and on the second white layer 34. However, the second white layer 34 need not necessarily be provided with print.

A laser printing layer sheet supply section 56 for superimposing a laser printing layer sheet 15 on the facial image 10A which has been transferred onto the transfer medium 1 is provided downstream of the intermediate transfer sheet supply section 52.

The laser printing layer sheet supply section 56 includes a feed roll 56a for unwinding the laser printing layer sheet 15. The laser printing layer sheet 15, which has been unwound from the feed roll 56a, is punched out on the transfer medium 1 by punching blades 56b, 56c, and then laminated to the transfer medium 1. The laser printing layer sheet 15 has a plurality of volume holograms 35 disposed thereon at predetermined intervals.

A transparent layer sheet supply section 57 for laminating a transparent layer sheet 17 to the laser printing layer sheet 15 is provided downstream of the laser printing layer sheet supply section 56.

The transparent layer sheet supply section 57 includes a feed roll 57a for unwinding the transparent layer sheet 17. The transparent layer sheet 17, which has been unwound from the feed roll 57a, is punched out on the transfer medium 1 by punching blades 57b, 57c, and then laminated to the laser printing layer sheet 15 (see FIG. 6).

Further, a bonding apparatus 60 for heating the laser printing layer sheet 15 and the transparent layer sheet 17 and pressing them against the transfer medium 1, thereby bonding the sheets 15, 17 to the transfer medium 1, is provided downstream of the transparent layer sheet supply section 57.

The bonding apparatus 60 includes a lower conveyor 62 stretched between a pair of lower rollers 61, 61, and an upper conveyor 64 stretched between a pair of upper rollers 63, 63. A heating board 65 and a cooling board 66 are provided on the upper conveyor 64 side.

Each of the lower conveyor 62 and the upper conveyor 64 is provided with a pressing plate (not shown). The transfer medium 1 is held between the pressing plate of the lower conveyor 62 and the pressing plate of the upper conveyor 64 while the transfer medium 1 is conveyed by the conveyers 62, 64.

The laser printing layer sheet 15 and the transparent layer sheet 17 on the transfer medium 1 are heated and pressed by the heating board 65 against the transfer medium 1 which is being conveyed by the lower conveyor 62 and the upper conveyor 64, and are then cooled by the cooling board 66.

The transfer medium 1, to which the laser printing layer sheet 15 and the transparent layer sheet 17 have been bonded by the bonding apparatus 60, is sent to a punching unit 70 including a punching blade 71, where the transfer medium 1 is punched out to remove a peripheral portion.

In particular, the transfer medium 1, loaded from the transfer medium loading section 51, has a shape which is slightly larger than that of the final product. After the bonding of the laser printing layer sheet 15 and the transparent layer sheet 17 to the transfer medium 1, the transfer medium 1 is punched out into the shape of the final product in the punching unit 70.

A laser printing apparatus 73 for irradiating the laser printing layer sheet 15 with laser light to form characters 10B in the laser printing layer sheet 15 is provided downstream of the punching unit 70. An ID mark reader 74 for reading the ID mark 10C such as a bar code or an ID number, which has been transferred to the transfer medium 1, is provided near the laser printing apparatus 73. A facial image recognizer 75 for reading the facial image 10A may be provided instead of or in addition to the ID mark reader 74.

The transfer medium 1, loaded from the transfer medium loading section 51, is transported by a transporter 80 from the transfer medium loading section 51 to the laser printing apparatus 73 via the intermediate transfer sheet supply section 52, the laser printing layer sheet supply section 56, the transparent layer sheet supply section 57, the bonding apparatus 60 and the punching unit 70.

The intermediate transfer sheet supply section 52 and the laser printing apparatus 73 are provided with an IC module writing section 76A and an IC module writing section 76B, respectively, for writing personal information of the holder into the IC module 20 of the transfer medium 1. The IC module writing section 76A or 76B may be provided in only one of the intermediate transfer sheet supply section 52 and the laser printing apparatus 73.

The above-described components of the card issuance system are connected to a controller 90, and are controlled by the controller 90.

The information of the ID mark 10C read by the ID mark reader 74 or the information of the facial image 10A read by the facial image recognizer 75 is sent to the controller 90.

The operation of the thus-constructed card issuance system according to this embodiment will now be described.

Figure 1:
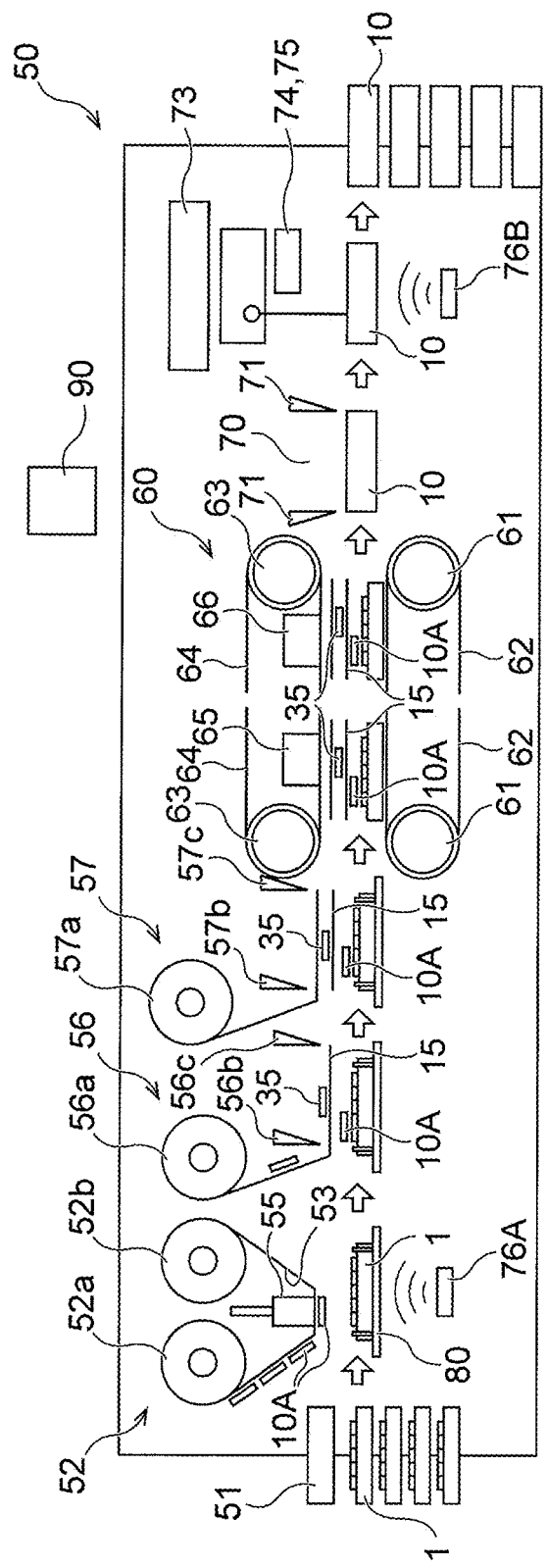
FIG. 1 is a schematic overall view of a medium issuance system according to a first embodiment of the present invention.
Figure 6:
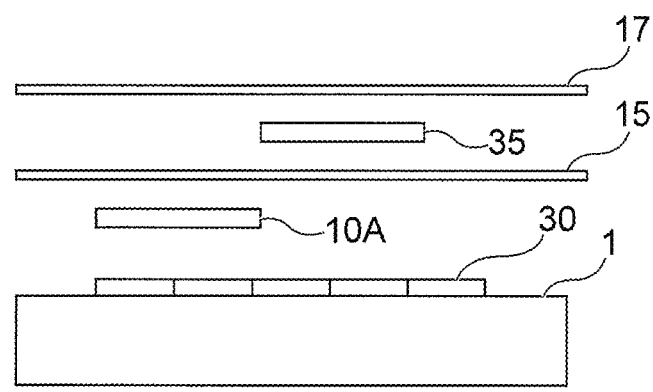
FIG. 6 is an enlarged view of a transfer medium, a laser printing layer sheet and a transparent sheet.

First, as shown in FIGS. 1 and 6, the transfer medium (transfer object) 1 is loaded from the transfer medium loading section 51 and transported by the transporter 80 to the intermediate transfer sheet supply section 52. The transfer medium 1 has the print 30 which has been provided by printing on the first white layer 33 and on the second white layer 34.

The transfer medium 1 may be matted (Ra not less than 0.2 μm) so as to facilitate transfer of the below-described facial image 10A and ID mark 10C of the intermediate transfer sheet 53 to the transfer medium 1. At this stage, the shape of the transfer medium 1 is slightly larger than that of the final product.

Next, the intermediate transfer sheet 53 is supplied onto the transfer medium 1 from the feed roll 52a of the intermediate transfer sheet supply section 52. The transfer medium 1-facing surface of the intermediate transfer sheet 53 has the facial image 10A of the holder and the ID mark 10C such as a bar code or an ID number. The ID mark 10C may be provided within the ID card 10 as the final product, or may be provided outside the ID card 10 as the final product and discarded after the punching of the transfer medium 1 into the shape of the final product. The ID mark 10C such as a bar code or an ID number, provided on the intermediate transfer sheet 53, is printed on the intermediate transfer sheet 53 with a common colored ink; however, the ID mark 10C may be printed with a colorless fluorescent ink.

Next, the hot stamp 55 comes into contact with the surface opposite to the transfer medium 1-facing surface of the intermediate transfer sheet 53, and the intermediate transfer sheet 53 is heated and pressed by the hot stamp 55. The heating temperature of the hot stamp 55 is set to be not less than 120° C. and not more than 200° C., and the pressure of the hot stamp 55 is set to be not less than 0.1 kgf/cm$^2$ and not more than 1000 kgf/cm$^2$. The heating temperature of the hot stamp 55 is preferably not less than 180° C. and not more than 190° C. The pressure of the hot stamp 55 is preferably not less than 2.2 MPa (22.43 kgf/cm$^2$) and not more than 3.5 MPa (35.69 kgf/cm$^2$). If the heating temperature of the hot stamp 55 is more than 190° C., peeling of the sheet after transfer may become difficult. On the other hand, if the heating temperature is less than 180° C., poor transfer of an image may occur. If the pressure of the hot stamp 55 is more than 3.5 MPa, peeling of the sheet after transfer may become difficult. On the other hand, if the pressure is less than 2.2 MPa, poor transfer of an image may occur.

An alignment mark may be put on each of the transfer medium 1 and the intermediate transfer sheet 53. When supplying the intermediate transfer sheet 53 onto the transfer medium 1, positioning between them can be performed by shooting the alignment marks with a positioning camera.

By thus heating and pressing the intermediate transfer sheet 53 with the hot stamp 55, the facial image 10A and the ID mark 10C, provided on the intermediate transfer sheet 53, can be securely transferred to the transfer medium 1.

Next, the transfer medium 1, to which the facial image 10A and the ID mark 10C have been transferred, is transported to the laser printing layer sheet supply section 56, where the laser printing layer sheet 15 from the feed roll 56a is laminated to the transfer medium 1.

The laser printing layer sheet 15 has the volume holograms 35 disposed thereon at predetermined intervals. The laser printing layer sheet 15, superimposed on the transfer medium 1, is punched out by the punching blades 56b, 56c. Examples of the volume hologram 35, provided on the laser printing layer sheet 15, may include various optical elements such as an emboss hologram, a Lippmann hologram, a color switch, a Fantaglass, a hologram thread, etc.

In addition to the volume hologram 35, the laser printing layer sheet 15 may be provided with a holder's ID number.

Next, the transfer medium 1, on which the laser printing layer sheet 15 is superimposed, is transported to the transparent layer sheet supply section 57, where the transparent layer sheet 17 from the feed roll 57a is laminated to the transfer medium 1. The transparent layer sheet 17, superimposed on the transfer medium 1, is punched out by the punching blades 57b, 57c.

Though in the above-described embodiment the volume hologram 35 is provided on the laser printing layer sheet 15, the volume hologram 35 may be provided on the transparent layer sheet 17.

In the above-described embodiment, the laser printing layer sheet 15 and the transparent layer sheet 17 are separately and independently supplied onto the transfer medium 1. However, it is also possible to integrally bond the laser printing layer sheet 15 and the transparent layer sheet 17 in advance, and to laminate the integrally-bonded laminate to the transfer medium 1. In this case, the integrally-bonded laminate of the laser printing layer sheet 15 and the transparent layer sheet 17 is provided with the volume hologram 35.

When forming the volume hologram 35 on the laser printing layer sheet 15 or the transparent layer sheet 17, the volume hologram 35 may be formed, for example, by transfer or adhesion.

Next, the transfer medium 1, on which the laser printing layer sheet 15 and the transparent layer sheet 17 are superimposed in this order, is transported to the bonding apparatus 60, where the laser printing layer sheet 15 and the transparent layer sheet 17 are heated and pressed by the heating board 65. In this manner, the laser printing layer sheet 15 and the transparent layer sheet 17 are bonded to the transfer medium 1.

The transfer medium 1, which has been heated and pressed by the heating board 65, is transported to the cooling board 66 and cooled by it.

As described above, the bonding apparatus 60 includes the lower conveyor 62 and the upper conveyor 64. The pressing plate of the upper conveyor 64 may have fine irregularities in the lower surface. In this case, the fine irregularities of the pressing plate can form fine lenticular lenses 31 on the transparent layer sheet 17.

The transfer medium 1, to which the laser printing layer sheet 15 and the transparent layer sheet 17 have been bonded, is transported to the punching unit 70, where the transfer medium 1 is punched out by the punching blade 71 to remove a peripheral portion so that the transfer medium 1 has the shape of the final product.

Next, the transfer medium 1 is transported to the laser printing apparatus 73, where the laser printing layer sheet 15 is irradiated with laser light to print the necessary characters 10B (see FIG. 5).

In particular, the ID mark 10C on the transfer medium 1 that has reached the laser printing apparatus 73 is read by the ID mark reader 74, and the facial image 10A on the transfer medium 1 is read by the facial image recognizer 75. The read information from the ID mark reader 74 and the read information from the facial image recognizer 75 are sent to the controller 90. The controller 90 performs matching between the read informations from the ID mark reader 74 and the facial image recognizer 75 and information on print to be printed by the laser printing apparatus 73. When the controller 90 determines that the read informations from the ID mark reader 74 and the facial image recognizer 75 match the print information, the controller 90 operates the laser printing apparatus 73 to irradiate the laser printing layer sheet 15 with laser light, thereby printing the necessary characters 10B.

At the same time, the controller 90 operates the IC module writing section 76B to write necessary ID information of the holder into the IC module 20.

Instead of operating the IC module writing section 76B to write necessary ID information into the IC module 20, the controller 90 may operate the IC module writing section 76A to write necessary ID information into the IC module 20 when the transfer medium 1 is transported to the intermediate transfer sheet supply section 52. It is also possible for the controller 90 to operate both the IC module writing sections 76A, 76B to write necessary ID information into the IC module 20.

Figure 7:
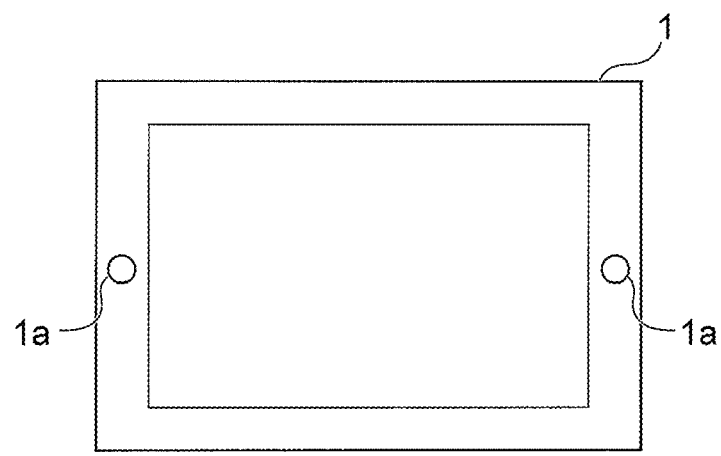
FIG. 7 is a diagram showing positioning holes of the transfer medium.

As described above, each of the transfer media 1, loaded from the transfer medium loading section 51, is sequentially transported between the components by the transporter 80 and reaches the laser printing apparatus 73. The transfer medium 1 has positioning holes 1a, while the transporter 80 has positioning pins that engage the positioning holes 1a of the transfer medium 1. The positioning pins of the transporter 80 are inserted into the positioning holes 1a of the transfer medium 1. This enables the transporter 80 to securely transport the transfer medium 1 while accurately positioning it (see FIG. 7).

The positioning holes 1a of the transfer medium 1 are provided in a peripheral area of the transfer medium 1 which is to be removed when the transfer medium 1 is punched out in the punching unit 70. As described hereinabove, according to this embodiment, the intermediate transfer sheet 53 can be securely heated and pressed by the hot stamp 55 at a predetermined temperature and a predetermined pressure. This makes it possible to securely transfer the facial image 10A and the ID mark 10C on the intermediate transfer sheet 53 to the transfer medium 1 without provision of a receiving layer on the transfer medium 1.

Second Embodiment

A card issuance system according to a second embodiment of the present invention will now be described with reference to FIGS. 8 through 10.

At the outset, an ID card 10, produced by the card issuance system according to the second embodiment, will be described.

Figure 9:
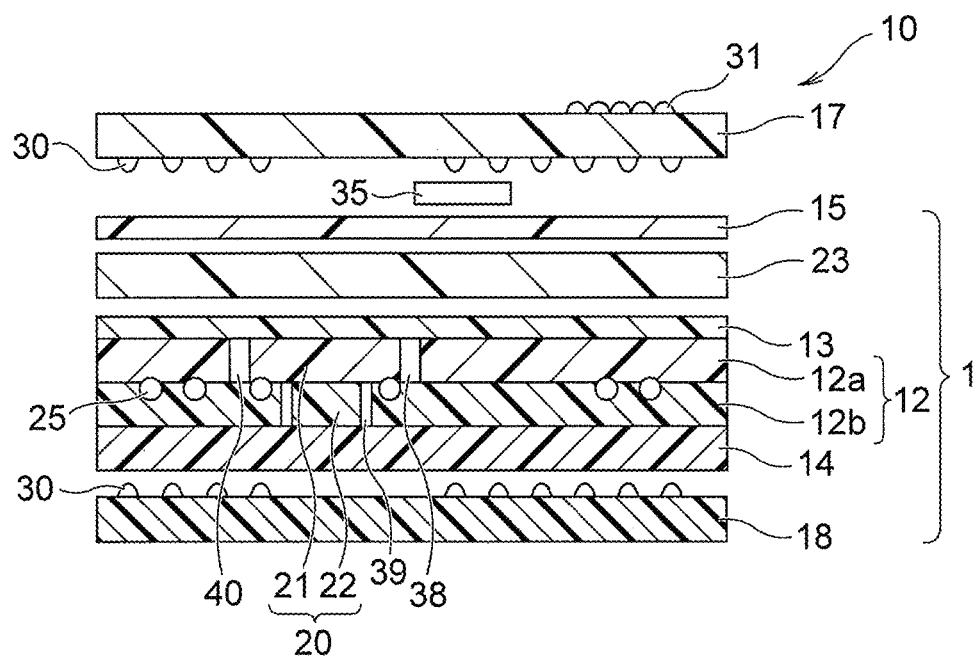
FIG. 9 is a cross-sectional side view of an ID card, showing a cross-section in the line-IX direction of FIG. 5.

As shown in FIG. 9, the ID card 10 includes an intermediate layer 13, an IC module holding layer 12 provided on the lower surface (one surface) of the intermediate layer 13, an IC module 20 held in the IC module holding layer 12, and a laser printing layer 15 provided on the upper surface (the other surface) of the intermediate layer 13 via a first white layer 23.

The IC module 20 includes a substrate 21, and an IC chip 22a provided on the substrate 21 and covered with a sealing resin 22b. The IC chip 22a and the sealing resin 22b constitute an IC chip body 22 (see FIG. 3). In the illustrated case, the thickness of the IC chip body 22 is larger than the thickness of the substrate 21. For example, the thickness of the IC chip body 22 is 50 µm to 220 µm, while the thickness of the substrate 21 is 50 µm to 100 µm. By making the thickness of the IC chip body 22 larger than the thickness of the substrate 21, deformation of the entire IC module 20 can be reduced.

The IC module 20 having the above construction is held in the IC module holding layer 12. In the illustrated case, the IC module holding layer 12 includes a substrate accommodating layer 12a accommodating the substrate 21 of the IC module 20 and housing the substrate 21, and an IC chip body accommodating layer (also referred to as an IC chip accommodating layer) 12b accommodating the IC chip body 22 containing the IC chip 22a, and housing the IC chip body 22.

An antenna 25, connected to the IC chip 22a of the IC module 20, is disposed between the substrate accommodating layer 12a and the IC chip accommodating layer 12b of the IC module holding layer 12. The antenna 25 is made of copper, and is interposed between the substrate accommodating layer 12a and the IC chip accommodating layer 12b (see FIG. 9).

The IC module holding layer 12 has an IC module housing space 40 in which the IC module 20 is housed and which is composed of an opening 38 formed in the substrate accommodating layer 12a, and an opening 39 formed in the IC chip accommodating layer 12b. The IC module housing space 40 is closed from above and below with the intermediate layer 13 and with an additional intermediate layer 14 provided on the lower surface of the IC module holding layer 12.

The laser printing layer 15 is blackened by irradiation with laser light so that a desired character can be displayed. To this end, the laser printing layer 15 is formed of polycarbonate containing a laser coloring accelerator and, when irradiated with laser light, the laser coloring accelerator is given heat energy. The heat energy chars and blackens carbon contained in the polycarbonate in contact with the laser coloring accelerator, resulting in display of a character.

A first external transparent layer 17 is provided on the upper surface of the laser printing layer 15, and a volume hologram 35 is interposed between the laser printing layer 15 and the first external transparent layer 17. The volume hologram 35 can display, for example, a crown in the ID card 10 (see FIG. 5).

Print 30, such as characters, a pattern, etc., has been formed on the lower surface (inner surface) of the first external transparent layer 17.

The print 30, such as characters, a pattern, etc., includes information displayed on the front surface of the ID card 10. Such information includes, for example, general information other than individual information such as name and address. The individual information such as name and address is formed by irradiating the laser printing layer 15 with laser light.

A second external transparent layer 18 is provided on the lower surface of the additional intermediate layer 14. Print 30, such as characters, a pattern, etc., has been formed also on the upper surface (inner surface) of the second external transparent layer 18.

The first white layer 23 functions to enhance visibility of the print 30, which has been formed on the lower surface of the first external transparent layer 17, when viewing the print 30 from the side of the first external transparent layer 17.

In particular, with the first white layer 23 provided under the first external transparent layer 17, the first white layer 23 serves as a background and enables the print 30, which is colored dark and formed on the lower surface of the first external transparent layer 17, to be easily viewed (checked) from the side of the first external transparent layer 17.

The materials of the respective layers constituting the ID card 10 will now be described.

The intermediate layer 13, the first external transparent layer 17 and the second external transparent layer 18 are all made of transparent polycarbonate.

The substrate accommodating layer 12a and the IC chip accommodating layer 12b of the IC module holding layer 12, the first white layer 23 and the additional intermediate layer 14 are all made of white polycarbonate.

The laser printing layer 15 is made of polycarbonate containing a laser coloring accelerator.

The first white layer 23, the intermediate layer 13, the IC module holding layer 12, the additional intermediate layer 14 and the second external transparent layer 18 of the ID card 10 constitute a transfer medium 1.

The ID card 10 can be obtained by bonding the laser printing layer (laser printing layer sheet) 15 and the first external transparent layer (transparent layer sheet) 17 to the transfer medium 1. Though all the layers are made of polycarbonate in the above-described embodiment, some layer(s) may be made of heat-resistant PET-G which is a composite material composed of polycarbonate and polyethylene terephthalate (PET).

A description will now be given of the card issuance system 50 for issuing the ID card 10.

As described above, the card issuance system 50 is to produce the ID card 10. As shown in FIG. 8, the card issuance system 50 includes a transfer medium loading section 51 for laminating and loading the polycarbonate transfer medium (transfer object) 1, an intermediate transfer sheet supply section 52, provided downstream of the transfer medium loading section 51 in the transport direction of the transfer medium 1, for supplying an intermediate transfer sheet 53 to the transfer medium 1 loaded from the transfer medium loading section 51, and a hot stamp 55, provided in the intermediate transfer sheet supply section 52, for heating and pressing the intermediate transfer sheet 53 from the surface opposite to the transfer medium 1-facing surface.

The intermediate transfer sheet supply section 52 includes a feed roll 52a for unwinding the intermediate transfer sheet 53, and a take-up roll 52b for taking up the intermediate transfer sheet 53. Print, including a facial image 10A and an ID mark 10C such as a bar code or an ID number, has been transferred to the transfer medium 1-facing surface of the intermediate transfer sheet 53.

The transfer medium 1, loaded from the transfer medium loading section 51, has the print 30 provided on the second external transparent layer 18.

A laser printing layer sheet supply section 56 for superimposing a laser printing layer sheet 15 on the facial image 10A which has been transferred onto the transfer medium 1 is provided downstream of the intermediate transfer sheet supply section 52.

The laser printing layer sheet supply section 56 includes a feed roll 56a for unwinding the laser printing layer sheet 15. The laser printing layer sheet 15, which has been unwound from the feed roll 56a, is punched out on the transfer medium 1 by punching blades 56*b*, 56*c*, and then laminated to the transfer medium 1. The laser printing layer sheet 15 has a plurality of volume holograms 35 disposed thereon at predetermined intervals.

A transparent layer sheet supply section 57A for laminating a transparent layer sheet 17 to the laser printing layer sheet 15 is provided downstream of the laser printing layer sheet supply section 56.

In the transparent layer sheet supply section 57A, the transparent layer sheet 17 in a precut form is laminated to the laser printing layer sheet 15. The transparent layer sheet 17, supplied from the transparent layer sheet supply section 57A, has print 30 that has been formed by printing on the laser printing layer sheet 15-side surface.

Further, a bonding apparatus 60 for heating the laser printing layer sheet 15 and the transparent layer sheet 17 and pressing them against the transfer medium 1, thereby bonding the sheets 15, 17 to the transfer medium 1, is provided downstream of the transparent layer sheet supply section 57A.

The bonding apparatus 60 includes a lower conveyor 62 stretched between a pair of lower rollers 61, 61, and an upper conveyor 64 stretched between a pair of upper rollers 63, 63. A heating board 65 and a cooling board 66 are provided on the upper conveyor 64 side.

Each of the lower conveyor 62 and the upper conveyor 64 is provided with a pressing plate (not shown). The transfer medium 1 is held between the pressing plate of the lower conveyor 62 and the pressing plate of the upper conveyor 64 while the transfer medium 1 is conveyed by the conveyors 62, 64.

The laser printing layer sheet 15 and the transparent layer sheet 17 on the transfer medium 1 are heated and pressed by the heating board 65 against the transfer medium 1 which is being conveyed by the lower conveyor 62 and the upper conveyor 64, and are then cooled by the cooling board 66.

The transfer medium 1, to which the laser printing layer sheet 15 and the transparent layer sheet 17 have been bonded by the bonding apparatus 60, is sent to a punching unit 70 including a punching blade 71, where the transfer medium 1 is punched out to remove a peripheral portion.

In particular, the transfer medium 1, loaded from the transfer medium loading section 51, has a shape which is slightly larger than the final product. After the bonding of the laser printing layer sheet 15 and the transparent layer sheet 17 to the transfer medium 1, the transfer medium 1 is punched out into the shape of the final product in the punching unit 70.

A laser printing apparatus 73 for irradiating the laser printing layer sheet 15 with laser light to form characters 10B in the laser printing layer sheet 15 is provided downstream of the punching unit 70. An ID mark reader 74 for reading the ID mark 10C such as a bar code or an ID number, which has been transferred to the transfer medium 1, is provided near the laser printing apparatus 73. A facial image recognizer 75 for reading the facial image 10A may be provided instead of or in addition to the ID mark reader 74.

The transfer medium 1, loaded from the transfer medium loading section 51, is transported by a transporter 80 from the transfer medium loading section 51 to the laser printing apparatus 73 via the intermediate transfer sheet supply section 52, the laser printing layer sheet supply section 56, the transparent layer sheet supply section 57A, the bonding apparatus 60 and the punching unit 70.

The intermediate transfer sheet supply section 52 and the laser printing apparatus 73 are provided with an IC module writing section 76A and an IC module writing section 76B, respectively, for writing personal information of the holder into the IC module 20 of the transfer medium 1. The IC module writing section 76A or 76B may be provided in only one of the intermediate transfer sheet supply section 52 and the laser printing apparatus 73.

The above-described components of the card issuance system are connected to a controller 90, and are controlled by the controller 90.

The information of the ID mark 10C read by the ID mark reader 74 or the information of the facial image 10A read by the facial image recognizer 75 is sent to the controller 90.

The operation of the thus-constructed card issuance system according to this embodiment will now be described.

Figure 8:
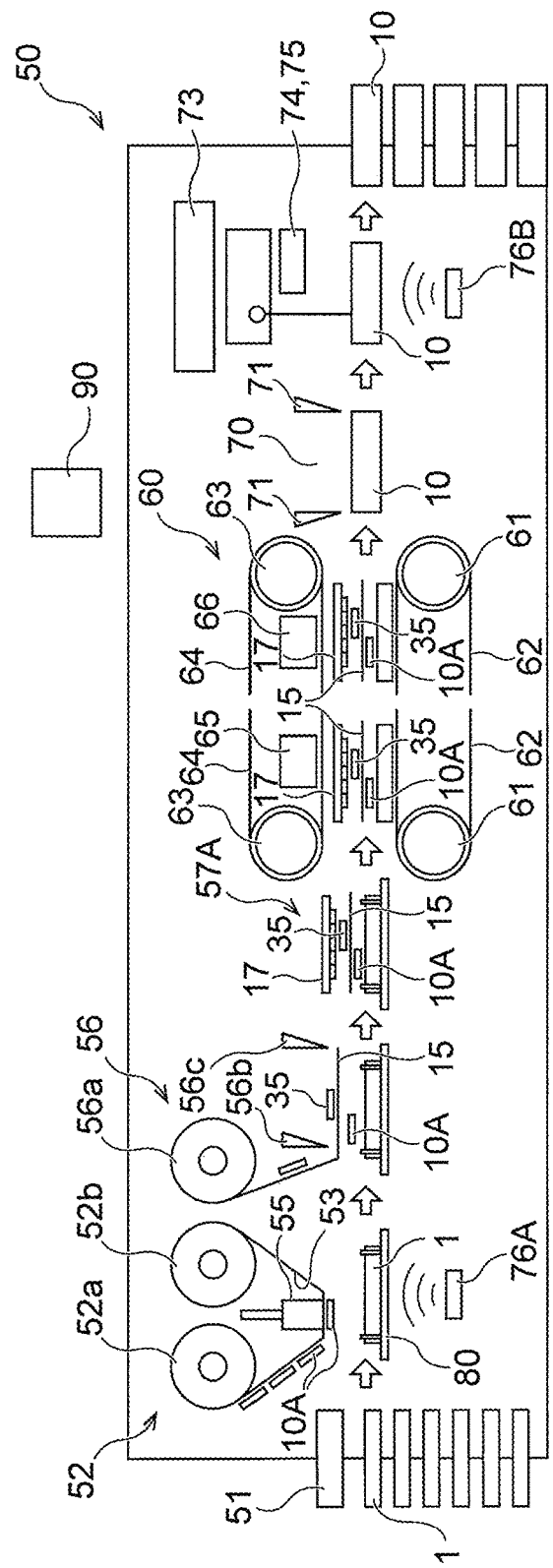
FIG. 8 is a schematic overall view of a medium issuance system according to a second embodiment of the present invention.
Figure 10:
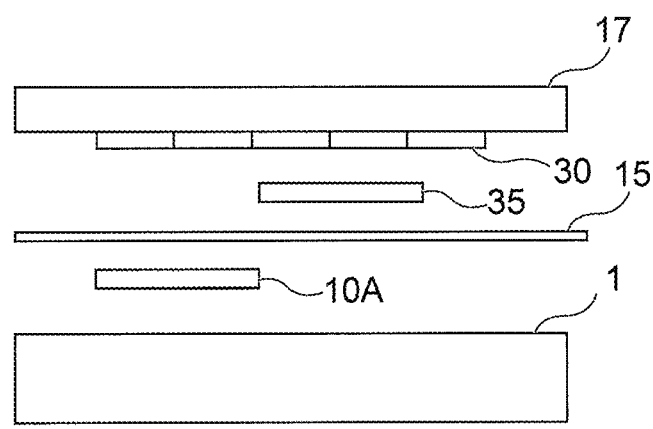
FIG. 10 is an enlarged view of a transfer medium, a laser printing layer sheet and a transparent sheet.

First, as shown in FIGS. 8 and 10, the transfer medium 1 is loaded from the transfer medium loading section 51 and transported by the transporter 80 to the intermediate transfer sheet supply section 52. The transfer medium 1 has the print 30 which has been provided by printing on the second external transparent layer 18.

The transfer medium 1 may be matted (Ra not less than 0.2 μm) so as to facilitate transfer of the below-described facial image 10A and ID mark 10C of the intermediate transfer sheet 53 to the transfer medium 1. At this stage, the shape of the transfer medium 1 is slightly larger than that of the final product.

Next, the intermediate transfer sheet 53 is supplied onto the transfer medium 1 from the feed roll 52*a* of the intermediate transfer sheet supply section 52. The transfer medium 1-facing surface of the intermediate transfer sheet 53 has the facial image 10A of the holder and the ID mark 10C such as a bar code or an ID number. The ID mark 10C may be provided in the ID card 10 as the final product, or may be provided outside the ID card 10 as the final product and discarded after the punching of the transfer medium 1 into the shape of the final product. The ID mark 10C such as a bar code or an ID number, provided on the intermediate transfer sheet 53, is printed on the intermediate transfer sheet 53 with a common colored ink; however, the ID mark 10C may be printed with a colorless fluorescent ink.

Next, the hot stamp 55 comes into contact with the surface opposite to the transfer medium 1-facing surface of the intermediate transfer sheet 53, and the intermediate transfer sheet 53 is heated and pressed by the hot stamp 55. The heating temperature of the hot stamp 55 is set to be not less than 120° C. and not more than 200° C., and the pressure of the hot stamp 55 is set to be not less than 0.1 kg/cm$^2$ and not more than 1000 kg/cm$^2$.

An alignment mark may be put on each of the transfer medium 1 and the intermediate transfer sheet 53. When supplying the intermediate transfer sheet 53 onto the transfer medium 1, positioning between them can be performed by shooting the alignment marks with a positioning camera.

By thus heating and pressing the intermediate transfer sheet 53 with the hot stamp 55, the facial image 10A and the ID mark 10C, provided on the intermediate transfer sheet 53, can be securely transferred to the transfer medium 1.

Next, the transfer medium 1, to which the facial image 10A and the ID mark 10C have been transferred, is transported to the laser printing layer sheet supply section 56, where the laser printing layer sheet 15 from the feed roll 56*a* is laminated to the transfer medium 1.

The laser printing layer sheet 15 has the volume holograms 35 disposed thereon at predetermined intervals. The laser printing layer sheet 15, superimposed on the transfer medium 1, is punched out by the punching blades 56*b*, 56*c*. Examples of the volume hologram 35, provided on the laser printing layer sheet 15, may include various optical elements such as an emboss hologram, a Lippmann hologram, a color switch, a Fantaglass, a hologram thread, etc.

In addition to the volume hologram 35, the laser printing layer sheet 15 may be provided with a holder's ID number.

Next, the transfer medium 1, on which the laser printing layer sheet 15 is superimposed, is transported to the transparent layer sheet supply section 57A, where the precut transparent layer sheet 17 supplied is laminated to the transfer medium 1. The transparent layer sheet 17 has the print 30 on the laser printing layer sheet 15-side surface (see FIG. 10).

With reference to the print 30, provided on the laser printing layer sheet 15-side surface of the transparent layer sheet 17 as shown in FIGS. 8 through 10, the print 30 is a security print formed, for example, by OVI printing or fluorescent printing.

The transparent layer sheet 17 may be subjected to security processing such as hologram threads or fluorescent fibers.

As described above, the transfer medium 1 has the print 30 provided on the second external transparent layer 18. The print 30, provided on the transparent layer sheet (the first external transparent layer) 17, may be one which, in combination with the print 30 on the second external transparent layer 18, displays a new design.

Though in the above-described embodiment the volume hologram 35 is provided on the laser printing layer sheet 15, the volume hologram 35 may be provided on the transparent layer sheet 17.

When forming the volume hologram 35 on the laser printing layer sheet 15 or the transparent layer sheet 17, the volume hologram 35 may be formed, for example, by transfer or adhesion.

Next, the transfer medium 1, on which the laser printing layer sheet 15 and the transparent layer sheet 17 are superimposed in this order, is transported to the bonding apparatus 60, where the laser printing layer sheet 15 and the transparent layer sheet 17 are heated and pressed by the heating board 65. In this manner, the laser printing layer sheet 15 and the transparent layer sheet 17 are bonded to the transfer medium 1.

The transfer medium 1, which has been heated and pressed by the heating board 65, is transported to the cooling board 66 and cooled by it.

As described above, the bonding apparatus 60 includes the lower conveyor 62 and the upper conveyor 64. The pressing plate of the upper conveyor 64 may have fine irregularities in the lower surface. In this case, the fine irregularities of the pressing plate can form fine lenticular lenses 31 on the transparent layer sheet 17.

The transfer medium 1, to which the laser printing layer sheet 15 and the transparent layer sheet 17 have been bonded, is transported to the punching unit 70, where the transfer medium 1 is punched out by the punching blade 71 to remove a peripheral portion so that the transfer medium 1 has the shape of the final product.

Next, the transfer medium 1 is transported to the laser printing apparatus 73, where the laser printing layer sheet 15 is irradiated with laser light to print the necessary characters 10B.

In particular, the ID mark 10C on the transfer medium 1 that has reached the laser printing apparatus 73 is read by the ID mark reader 74, and the facial image 10A on the transfer medium 1 is read by the facial image recognizer 75. The read information from the ID mark reader 74 and the read information from the facial image recognizer 75 are sent to the controller 90. The controller 90 performs matching of the read informations from the ID mark reader 74 and the facial image recognizer 75 with information on print to be printed by the laser printing apparatus 73. When the controller 90 determines that the read informations from the ID mark reader 74 and the facial image recognizer 75 match the print information, the controller 90 operates the laser printing apparatus 73 to irradiate the laser printing layer sheet 15 with laser light, thereby printing the necessary characters 10B.

At the same time, the controller 90 operates the IC module writing section 76B to write necessary ID information of the holder into the IC module 20.

Instead of operating the IC module writing section 76B to write necessary ID information of the holder into the IC module 20, the controller 90 may operate the IC module writing section 76A to write necessary ID information into the IC module 20 when the transfer medium 1 is transported to the intermediate transfer sheet supply section 52. It is also possible for the controller 90 to operate both the IC module writing sections 76A, 76B to write necessary ID information into the IC module 20.

As described above, each of the transfer media 1, loaded from the transfer medium loading section 51, is sequentially transported between the components by the transporter 80 and reaches the laser printing apparatus 73. The transfer medium 1 has positioning holes 1a, while the transporter 80 has positioning pins that engages the positioning holes 1a of the transfer medium 1. The positioning pins of the transporter 80 are inserted into the positioning holes 1a of the transfer medium 1. This makes it possible to securely transport the transfer medium 1 while accurately positioning it with the transporter 80 (see FIG. 7).

The positioning holes 1a of the transfer medium 1 are provided in a peripheral area of the transfer medium 1 which is to be removed when the transfer medium 1 is punched out in the punching unit 70. As described hereinabove, according to this embodiment, the intermediate transfer sheet 53 can be securely heated and pressed by the hot stamp 55 at a predetermined temperature and a predetermined pressure. This makes it possible to securely transfer the facial image 10A and the ID mark 10C of the intermediate transfer sheet 53 to the transfer medium 1 without provision of a receiving layer on the transfer medium 1.

Another Embodiment

Another embodiment of a card issuance system will now be described with reference to FIGS. 11 and 12.

Figure 11:
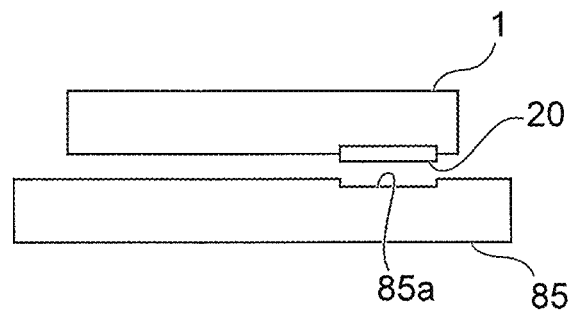
FIG. 11 is a diagram showing a cushioning material according to another embodiment of the present invention.
Figure 12:
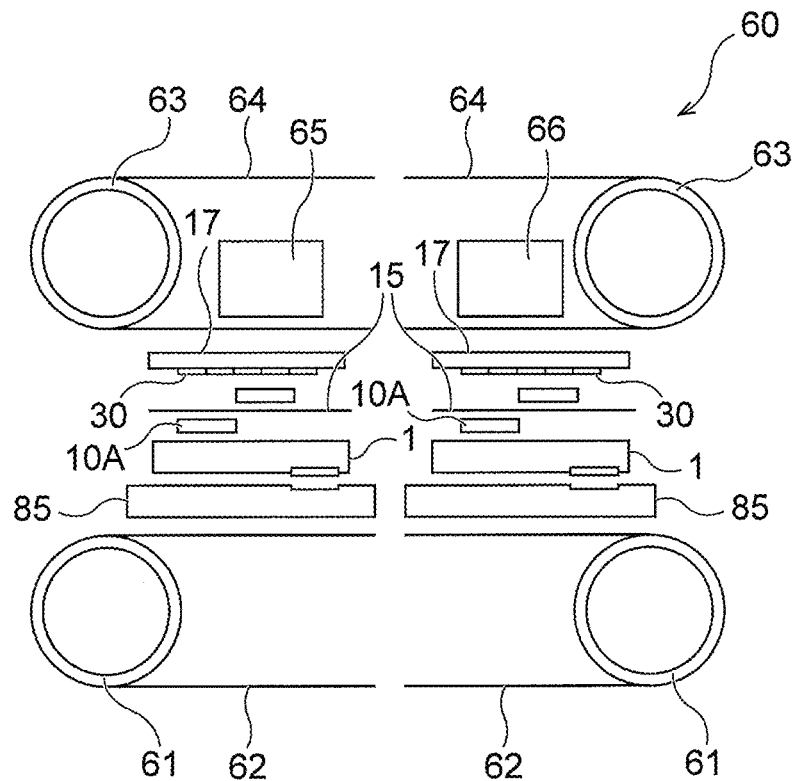
FIG. 12 is a diagram showing a bonding apparatus according to the another embodiment of the present invention.

The embodiment shown in FIGS. 11 and 12 differs from the second embodiment shown in FIGS. 8 through 10 only in the construction of the bonding apparatus 60; thus, the other construction is the same as that of the second embodiment.

The bonding apparatus 60 shown in FIGS. 11 and 12 is adapted to a transfer medium 1 having, instead of the contactless IC module 20, a contact-type IC module 20 provided on the back surface of the transfer medium 1.

In particular, the bonding apparatus 60 includes a lower conveyor 62 stretched between a pair of lower rollers 61, 61, and an upper conveyor 64 stretched between a pair of upper rollers 63, 63. A heating board 65 and a cooling board 66 are provided on the upper conveyor 64 side.

Each of the lower conveyor 62 and the upper conveyor 64 is provided with a pressing plate (not shown). The transfer medium 1 is held between the pressing plate of the lower conveyor 62 and the pressing plate of the upper conveyor 64 while the transfer medium 1 is conveyed by the conveyors 62, 64.

A cushioning material 85, e.g. made of a silicon material, is provided between the transfer medium 1 and the pressing plate of the lower conveyor 62 in order to avoid direct contact of the transfer medium 1 with the pressing plate. A recess 85a for housing the IC module 20 is formed in the surface of the cushioning material 85 at a position corresponding to the IC module 20. The cushioning material 85 having the recess 85a can effectively protect the IC module 20 when heating and pressing the transfer medium 1 with the bonding apparatus 60.

Figure 15:
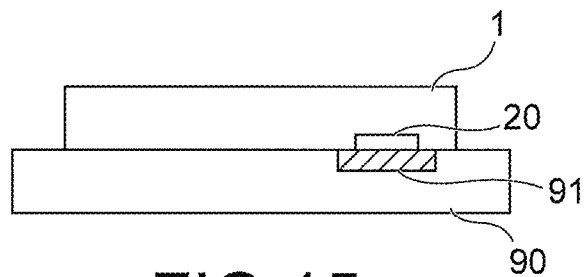
FIG. 15 is a diagram showing a pressing plate and a cushioning material.

Alternatively, as shown in FIG. 15, the transfer medium 1 may be placed on a pressing plate 90 having a cushioning material 91, e.g. made of a silicon material, disposed only in a portion of the cushioning material 91 which corresponds to the contact-type IC module 20 of the transfer medium 1.

Third Embodiment

A card issuance system according to a third embodiment will now be described with reference to FIGS. 13 through 16D.

In the third embodiment shown in FIGS. 13 through 16D, the same symbols are used for the same components or elements as those of the first embodiment shown in FIGS. 1 through 7, and a detailed description thereof is omitted.

At the outset, an ID card 10, produced by the card issuance system 50 according to the third embodiment, will be described.

Figure 14:
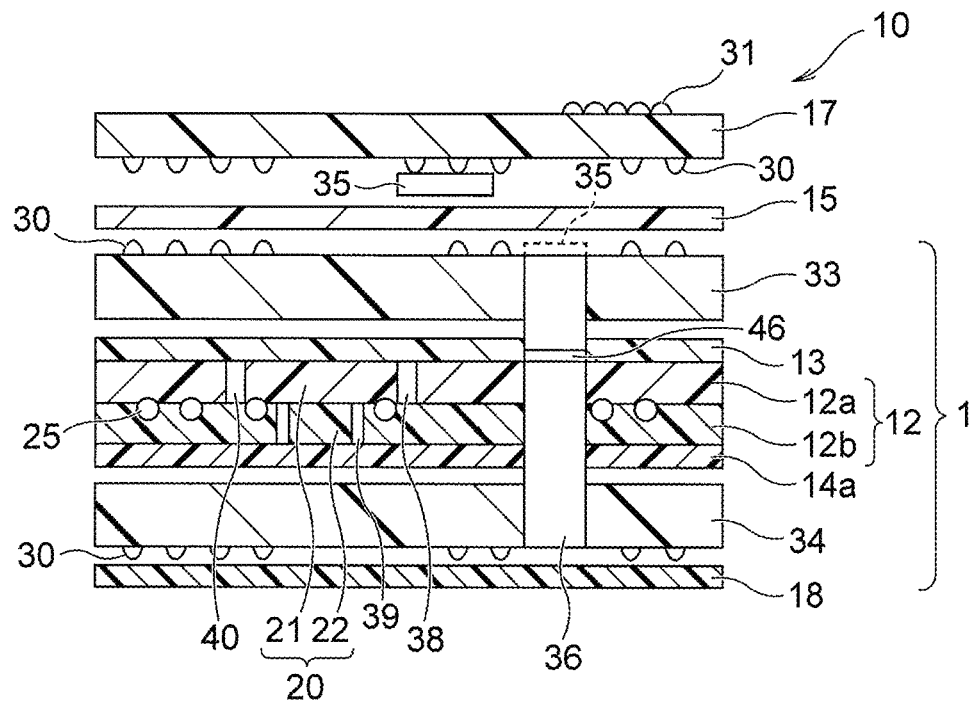
FIG. 14 is a cross-sectional view of an ID card according to the third embodiment.

As shown in FIG. 14, the ID card 10 includes an intermediate layer 13, an IC module holding layer 12 provided on the lower surface (one surface) of the intermediate layer 13, an IC module 20 held in the IC module holding layer 12, and a laser printing layer 15 provided on the upper surface (the other surface) of the intermediate layer 13 via a first white layer 33.

The IC module 20 is held in the IC module holding layer 12. In the illustrated case, the IC module holding layer 12 includes a substrate accommodating layer 12a accommodating the substrate 21 of the IC module 20 and housing the substrate 21, and an IC chip body accommodating layer (also referred to as an IC chip accommodating layer) 12b accommodating the IC chip body 22 containing the IC chip 22a, and housing the IC chip body 22.

An antenna 25, connected to the IC chip 22a of the IC module 20, is disposed between the substrate accommodating layer 12a and the IC chip accommodating layer 12b of the IC module holding layer 12. The antenna 25 is made of copper, and provided on a substrate 25a and, together with the substrate 25a, is interposed between the substrate accommodating layer 12a and the IC chip accommodating layer 12b (see FIG. 14).

The IC module holding layer 12 has an IC module housing space 40 in which the IC module 20 is housed and which is composed of an opening 38 formed in the substrate accommodating layer 12a, and an opening 39 formed in the IC chip accommodating layer 12b. The IC module housing space 40 is closed from above and below with the intermediate layer 13 and with an additional intermediate layer 14a provided on the lower surface of the IC module holding layer 12.

The laser printing layer 15 is blackened by irradiation with laser light so that a desired character can be displayed. To this end, the laser printing layer 15 is formed of polycarbonate containing a laser coloring accelerator and, when irradiated with laser light, the laser coloring accelerator is given heat energy. The heat energy chars and blackens carbon contained in the polycarbonate in contact with the laser coloring accelerator, resulting in display of a character.

A first external transparent layer 17 is provided on the upper surface of the laser printing layer 15, and a volume hologram 35 is interposed between the laser printing layer 15 and the first external transparent layer 17. The volume hologram 35 can display, for example, a crown in the ID card 10 (see FIG. 5).

Print 30, such as characters, a pattern, etc., has been formed on the lower surface (inner surface) of the first external transparent layer 17 and on the upper surface (outer surface) of the first white layer 33.

A second white layer 34 and a second external transparent layer 18 are provided in this order on the lower surface of the additional intermediate layer 14a. Print 30, such as characters, a pattern, etc., has been formed also on the lower surface (outer surface) of the second white layer 34.

There is also provided a transparent window 36 made of a transparent material and penetrating the first white layer 33, the intermediate layer 13, the IC module holding layer 12, the additional intermediate layer 14a and the second white layer 34.

The materials of the respective layers constituting the ID card 10 will now be described.

The intermediate layer 13, the first external transparent layer 17, the additional intermediate layer 14a and the second external transparent layer 18 are all made of transparent polycarbonate.

The substrate accommodating layer 12a and the IC chip accommodating layer 12b of the IC module holding layer 12, the first white layer 33 and the second white layer 34 are all made of white polycarbonate.

The laser printing layer 15 is made of polycarbonate containing a laser coloring accelerator.

Of the above layers, the first white layer 33 functions to enhance visibility of the print 30, which has been formed on the lower surface of the first external transparent layer 17, when viewing the print 30 from the side of the first external transparent layer 17.

In particular, with the first white layer 33 provided under the first external transparent layer 17, the first white layer 33 serves as a background and enables the print 30, which is colored dark and formed on the lower surface of the first external transparent layer 17, to be easily viewed (checked) from the side of the first external transparent layer 17.

Light-colored print 30 has been formed on the first white layer 33. Since the print 30 is provided on the first white layer 33, the print 30 can be easily viewed (checked) from the side of the first external transparent layer 17.

Further, light-colored print 30 has been formed on the second white layer 34. Since the print 30 is provided on the second white layer 34, the print 30 can be easily viewed (checked) from the side of the second external transparent layer 18.

A description will now be given of the transparent window 36 penetrating the first white layer 33, the intermediate layer 13, the IC module holding layer 12, the additional intermediate layer 14a and the second white layer 34.

The transparent window 36 can be set up by sequentially superimposing the first white layer 33, the intermediate layer 13, the IC module holding layer 12 incorporating the IC module 20, the additional intermediate layer 14a, and the second white layer 34 into a laminate, forming a through-hole in the laminate, and then inserting the transparent window 36 of polycarbonate into the through-hole.

The transparent window 36 of polycarbonate functions to prevent counterfeiting. The transparent window 36 may be formed of half portions 36*a*, 36*a*, and an image film 46 having a particular image may be interposed between the portions 36*a*, 36*a*. In this case, the transparent window 36 having the image film 46 is inserted into the through-hole of the laminate.

The ID card 10 contains the volume hologram 35 (see FIG. 13), including one which displays a crown, provided between the laser printing layer 15 and the first external transparent layer 17. The volume hologram 35 can be obtained by transferring a transfer sheet, containing the volume hologram 35, to the upper surface of the laser printing layer 15. Subsequently, the first external transparent layer 17 is laminated to the laser printing layer 15.

It is also possible to interpose the volume hologram 35 between the laser printing layer 15 and the first white layer 33 by first transferring a transfer sheet, containing the volume hologram 35, to the laser printing layer 15 to thereby provide the volume hologram 35 on the laser printing layer 15, and then laminating the first white layer 33 to the laser printing layer 15.

Figure 4:
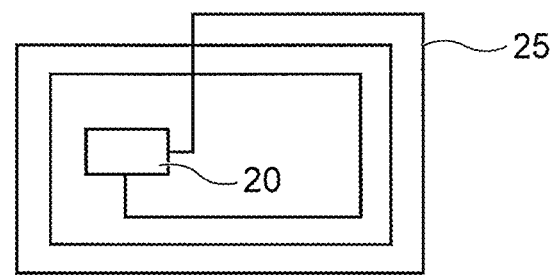
FIG. 4 is a diagram showing a positional relationship between an antenna and the IC module.

In the above-described embodiments, the antenna 25 is connected to the IC module 20 (see FIG. 4). The antenna 25, connected to the IC module 20, may be disposed as shown in FIGS. 16A through 16D.

Figure 16A:
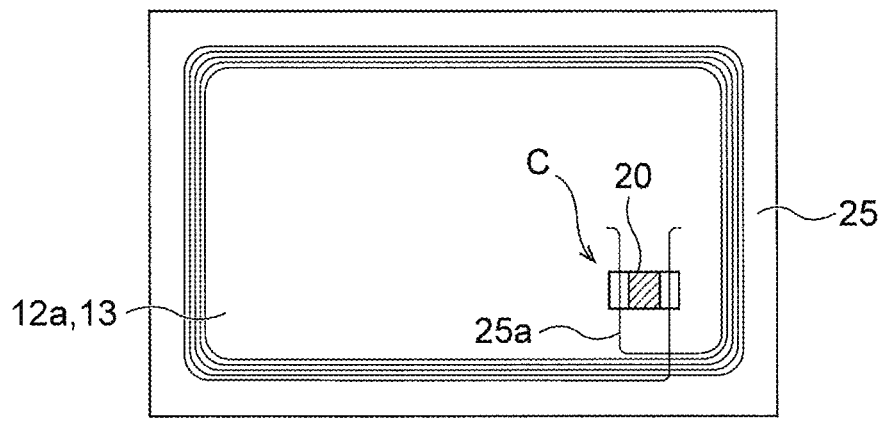
FIG. 16A is a diagram showing an antenna and an IC module, disposed on an intermediate layer and a substrate accommodating layer.
Figure 16B:
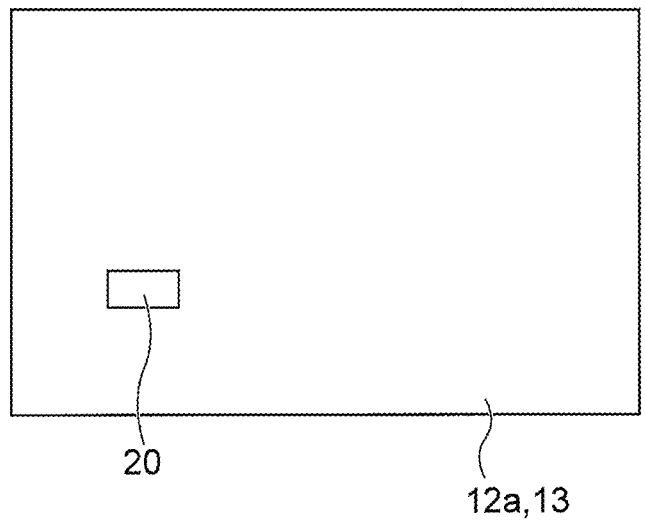
FIG. 16B is a diagram showing the antenna and the IC module when viewed from the back side of the intermediate layer and the substrate accommodating layer.

FIG. 16A is a diagram showing the antenna 25 and the IC module 20, disposed on the intermediate layer 13 and the substrate accommodating layer 12*a*, and FIG. 16B is a diagram showing the antenna 25 and the IC module 20 when viewed from the side of the intermediate layer 13 and the substrate accommodating layer 12*a*.

As shown in FIGS. 16A through 16D, the antenna 25 is disposed in a winding shape on a peripheral portion of the intermediate layer 13 and the substrate accommodating layer 12*a*, and a part 25*a* of the antenna 25 extends inward from the winding and is connected to the IC module 20 provided inside the winding of the antenna 25.

Figure 16C:
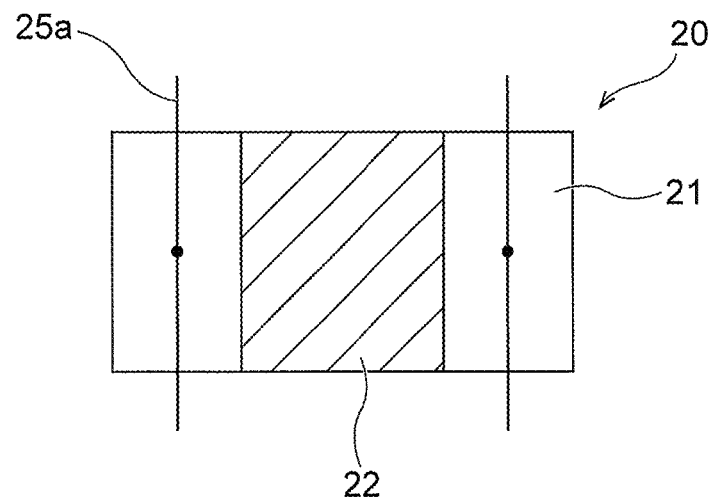
FIG. 16C is an enlarged plan view of the IC module, showing an enlarged view of the portion C of FIG. 16A.
Figure 16D:
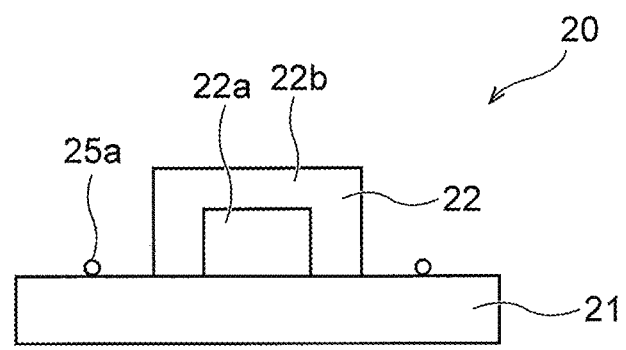
FIG. 16D is an enlarged cross-sectional view of the IC module.

Referring to FIGS. 16C and 16D, the IC module 20 includes a substrate 21, and an IC chip 22*a* provided on the substrate 21 and covered with a sealing resin 22*b*. The IC chip 22*a* and the sealing resin 22*b* constitute an IC chip body 22.

Figure 13:
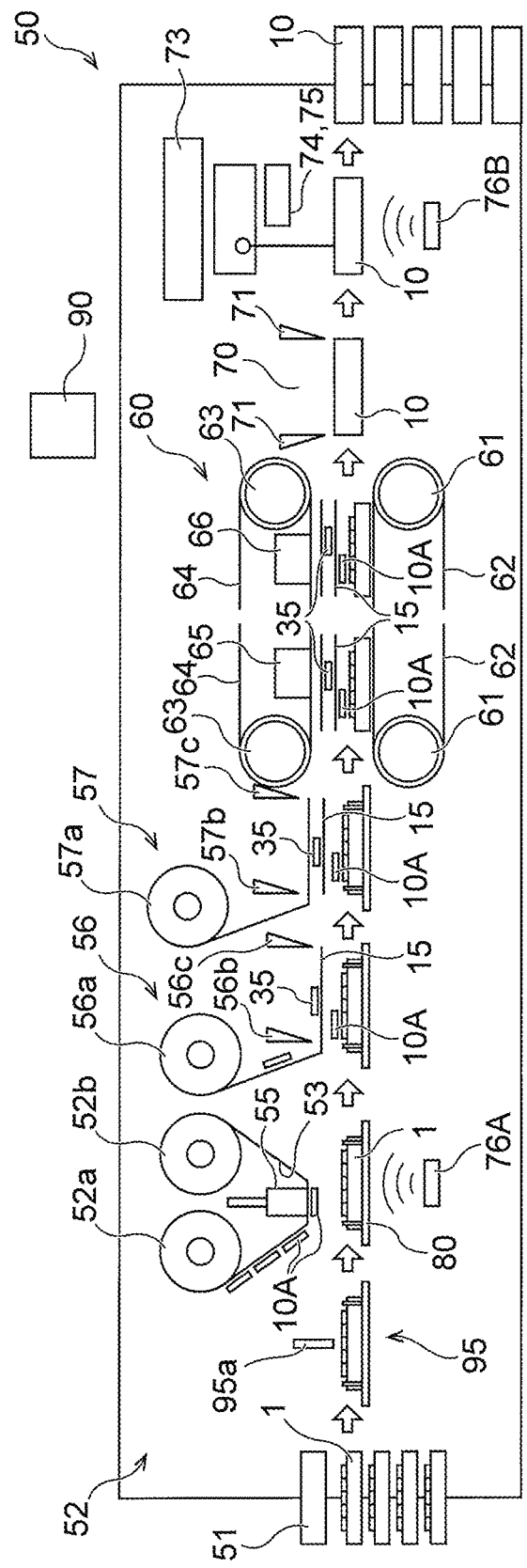
FIG. 13 is a schematic overall view of a medium issuance system according to a third embodiment of the present invention.

The card issuance system 50 for producing the ID card 10 will now be described with reference to FIG. 13.

As described above, the card issuance system 50 is to produce the ID card 10. The card issuance system 50 includes a transfer medium loading section 51 for laminating and loading the polycarbonate transfer medium (polycarbonate transfer object) 1, a punching/insertion section 95, provided downstream of the transfer medium loading section 51 in the transport direction of the transfer medium 1, for punching a through-hole in the transfer medium 1 loaded from the transfer medium loading section 51, and inserting the transparent window 36 of polycarbonate into the through-hole, an intermediate transfer sheet supply section 52 for supplying an intermediate transfer sheet 53 to the transfer medium 1 having the inserted transparent window 36, and a hot stamp 55, provided in the intermediate transfer sheet supply section 52, for heating and pressing the intermediate transfer sheet 53 from the surface opposite to the transfer medium 1-facing surface. The punching/insertion section 95 has a punch 95*a* for punching the through-hole in the transfer medium 1. After forming the through-hole in the transfer medium 1, the punch 95*a* holds the transparent window 36 and inserts it into the through-hole of the transfer medium 1.

The intermediate transfer sheet supply section 52 includes a feed roll 52*a* for unwinding the intermediate transfer sheet 53, and a take-up roll 52*b* for taking up the intermediate transfer sheet 53. Print, including a facial image 10A and an ID mark 10C such as a bar code or an ID number, has been transferred to the transfer medium 1-facing surface of the intermediate transfer sheet 53 (see FIG. 5).

The transfer medium 1, loaded from the transfer medium loading section 51, has the print 30 provided on the first white layer 33 and on the second white layer 34. However, the second white layer 34 need not necessarily be provided with print.

A laser printing layer sheet supply section 56 for superimposing a laser printing layer sheet 15 on the facial image 10A which has been transferred onto the transfer medium 1 is provided downstream of the intermediate transfer sheet supply section 52.

The laser printing layer sheet supply section 56 includes a feed roll 56*a* for unwinding the laser printing layer sheet 15. The laser printing layer sheet 15, which has been unwound from the feed roll 56*a*, is punched out on the transfer medium 1 by punching blades 56*b*, 56*c*, and then laminated to the transfer medium 1. The laser printing layer sheet 15 has a plurality of volume holograms 35 disposed thereon at predetermined intervals.

A transparent layer sheet supply section 57 for laminating a transparent layer sheet 17 to the laser printing layer sheet 15 is provided downstream of the laser printing layer sheet supply section 56.

The transparent layer sheet supply section 57 includes a feed roll 57*a* for unwinding the transparent layer sheet 17. The transparent layer sheet 17, which has been unwound from the feed roll 57*a*, is punched out on the transfer medium 1 by punching blades 57*b*, 57*c*, and then laminated to the laser printing layer sheet 15 (see FIG. 14).

Further, a bonding apparatus 60 for heating the laser printing layer sheet 15 and the transparent layer sheet 17 and pressing them against the transfer medium 1, thereby bonding the sheets 15, 17 to the transfer medium 1, is provided downstream of the transparent layer sheet supply section 57.

The bonding apparatus 60 includes a lower conveyor 62 stretched between a pair of lower rollers 61, 61, and an upper conveyor 64 stretched between a pair of upper rollers 63, 63. A heating board 65 and a cooling board 66 are provided on the upper conveyor 64 side.

Each of the lower conveyor 62 and the upper conveyor 64 is provided with a pressing plate (not shown). The transfer medium 1 is held between the pressing plate of the lower conveyor 62 and the pressing plate of the upper conveyor 64 while the transfer medium 1 is conveyed by the conveyers 62, 64.

The laser printing layer sheet 15 and the transparent layer sheet 17 on the transfer medium 1 are heated and pressed by the heating board 65 against the transfer medium 1 which is being conveyed by the lower conveyor 62 and the upper conveyor 64, and are then cooled by the cooling board 66.

The transfer medium 1, to which the laser printing layer sheet 15 and the transparent layer sheet 17 have been bonded by the bonding apparatus 60, is sent to a punching unit 70 including a punching blade 71, where the transfer medium 1 is punched out to remove a peripheral portion.

In particular, the transfer medium 1, loaded from the transfer medium loading section 51, has a shape which is slightly larger than the final product. After the bonding of the laser printing layer sheet 15 and the transparent layer sheet 17 to the transfer medium 1, the transfer medium 1 is punched out into the shape of the final product in the punching unit 70.

A laser printing apparatus 73 for irradiating the laser printing layer sheet 15 with laser light to form characters 10B in the laser printing layer sheet 15 is provided downstream of the punching unit 70. An ID mark reader 74 for reading the ID mark 10C such as a bar code or an ID number, which has been transferred to the transfer medium 1, is provided near the laser printing apparatus 73. A facial image recognizer 75 for reading the facial image 10A may be provided instead of or in addition to the ID mark reader 74.

The transfer medium 1, loaded from the transfer medium loading section 51, is transported by a transporter 80 from the transfer medium loading section 51 to the laser printing apparatus 73 via the intermediate transfer sheet supply section 52, the laser printing layer sheet supply section 56, the transparent layer sheet supply section 57, the bonding apparatus 60 and the punching unit 70.

The intermediate transfer sheet supply section 52 and the laser printing apparatus 73 are provided with an IC module writing section 76A and an IC module writing section 76B, respectively, for writing personal information of the holder into the IC module 20 of the transfer medium 1. The IC module writing section 76A or 76B may be provided in only one of the intermediate transfer sheet supply section 52 and the laser printing apparatus 73.

The above-described components of the card issuance system are connected to a controller 90, and are controlled by the controller 90.

The information of the ID mark 10C read by the ID mark reader 74 or the information of the facial image 10A read by the facial image recognizer 75 is sent to the controller 90.

In the ID card 10 shown in FIGS. 2 and 9, etc., the laser printing layer 15 is provided between the first external transparent layer 17 and the first white layer 23. The laser printing layer 15 may additionally be provided between the second external transparent layer 18 and the additional intermediate layer 14. This makes it possible to print characters with laser light not only on the facial image side (front side) but also on the back side of the ID card. The laser printing layer 15 may be provided only on the back side. By providing the laser printing layer on either one of the front side and the backside of the medium, or on both sides thereof, it becomes possible to provide the medium in the final form that meets a particular demand.

DESCRIPTION OF THE SYMBOLS 1 transfer medium
10 ID card
10A facial image
10B characters
11 information page
11a information page body
11b hinge portion
12 IC module holding layer
12a substrate accommodating layer
12b IC chip accommodating layer
13 intermediate layer
14 additional intermediate layer
15 laser printing layer
17 first external transparent layer
18 second external transparent layer
20 IC module
21 substrate
22 IC chip body
22a IC chip
22b sealing resin
23 first white layer
25 antenna
30 print
31 lenticular lenses
33 first white layer
34 second white layer
35 volume hologram
40 IC module housing space
50 card issuance system
51 transfer medium loading section
52 intermediate transfer sheet supply section
53 intermediate transfer sheet
55 hot stamp
56 laser printing layer sheet supply section
57, 57A transparent layer sheet supply section
60 bonding apparatus
70 punching unit
73 laser printing apparatus
74 ID mark reader
75 facial image recognizer
76A, 76B IC module writing section
80 transporter
90 controller

The invention claimed is:

1. A medium issuance system, comprising:
a transfer medium loading section for loading a transfer medium having positioning holes;
an intermediate transfer sheet supply section, provided downstream of the transfer medium loading section in a transport direction of the transfer medium, for supplying an intermediate transfer sheet to the transfer medium loaded from the transfer medium loading section, said intermediate transfer sheet having print, including an image, which has been transferred to its transfer medium-facing surface;
a hot stamp, provided in the intermediate transfer sheet supply section, for heating and pressing the intermediate transfer sheet from the surface opposite to the transfer medium-facing surface, thereby transferring the print to an outermost surface of the transfer medium without adhesiveness; and
a transporter for transporting the transfer medium having positioning pins capable of being inserted into the positioning holes of the transfer medium, loaded from the transfer medium loading section, to the intermediate transfer sheet supply section,
further comprising:
a laser printing layer sheet supply section, provided downstream of the intermediate transfer sheet supply section, for superimposing a laser printing layer sheet on the print which has been transferred to the transfer medium,
a laser printing apparatus, provided downstream of the laser printing layer sheet supply section, for irradiating the laser printing layer sheet with laser light to perform printing, and
an image recognizer for recognizing an image on the transfer medium,
wherein the hot stamp heats and presses the intermediate transfer sheet against the transfer medium transported by the transporter at a temperature of not less than 120° C. and not more than 200° C., and at a pressure of not less than 0.1 kgf/cm$^2$ and not more than 1000 kgf/cm$^2$, and wherein the print of the transfer medium includes an ID mark, and the medium issuance system is provided with an ID mark reader for reading the ID mark, and wherein the medium issuance system is also provided with a controller which performs matching between read information from the ID mark reader and the image recognizer and printing information to be sent to the laser printing apparatus.

2. The medium issuance system according to claim 1, further comprising a transparent layer sheet supply section, provided downstream of the laser printing layer sheet supply section, for laminating a transparent layer sheet to the laser printing layer sheet.

3. The medium issuance system according to claim 2, further comprising a bonding apparatus, provided downstream of the transparent layer sheet supply section, for heating the laser printing layer sheet and the transparent layer sheet and pressing the laser printing layer sheet and the transparent layer sheet against the transfer medium.

4. The medium issuance system according to claim 2, wherein the transfer medium contains an IC module, and the medium issuance system is provided with an IC module writing section for writing data into the IC module.

5. The medium issuance system according to claim 1, wherein the transfer medium contains an IC module, and the medium issuance system is provided with an IC module writing section for writing data into the IC module.

6. The medium issuance system according to claim 5, further comprising a punching device, provided upstream of the laser printing apparatus, for punching out the transfer medium to remove a peripheral portion thereof.

7. The medium issuance system according to claim 1, further comprising a punching device, provided upstream of the laser printing apparatus, for punching out the transfer medium to remove a peripheral portion thereof.

8. A medium issuance method, comprising the steps of:

supplying an intermediate transfer sheet from an intermediate transfer sheet supply section to a transfer medium, said intermediate transfer sheet having print, including an image, which has been transferred to its transfer medium-facing surface, and said transfer medium having positioning holes configured to engage with positioning pins on a transporter; and heating and pressing the intermediate transfer sheet from the surface opposite to the transfer medium-facing surface by using a hot stamp, thereby transferring the print to an outermost surface of the transfer medium without adhesiveness, and superimposing a laser printing layer sheet on the print which has been transferred to the transfer medium by a laser printing layer sheet supply section, provided downstream of the intermediate transfer sheet supply section, and irradiating the laser printing layer sheet with laser light to perform printing by a laser printing apparatus provided downstream of the laser printing layer sheet supply section, and recognizing an image on the transfer medium by an image recognizer, wherein the print of the transfer medium includes an ID mark, and the medium issuance system is provided with an ID mark reader for reading the ID mark, and wherein the medium issuance system is also provided with a controller which performs matching between read information from the ID mark reader and the image recognizer and printing information to be sent to the laser printing apparatus, and wherein the hot stamp heats and presses the intermediate transfer sheet against the transfer medium transported by a transporter at a temperature of not less than 120° C. and not more than 200° C., and at a pressure of not less than 0.1 kgf/cm$^2$ and not more than 1000 kgf/cm$^2$.

* * * * *